No. 708,643.  
J. P. HULTGREN.  
CENTRIFUGAL SEPARATOR.  
(Application filed Mar. 7, 1901.)  
Patented Sept. 9, 1902.

(No Model.)

Witnesses:  
Gustaf Isfält  
John Johansson

Inventor:  
J. P. Hultgren  
by Ocofdahl  
his att'y

UNITED STATES PATENT OFFICE.

JOHAN PETTER HULTGREN, OF STOCKHOLM, SWEDEN, ASSIGNOR OF ONE-HALF TO FILIP HENRIK GETZMANN, OF STOCKHOLM, SWEDEN.

CENTRIFUGAL SEPARATOR.

SPECIFICATION forming part of Letters Patent No. 708,643, dated September 9, 1902.

Application filed March 7, 1901. Serial No. 50,219. (No model.)

*To all whom it may concern:*

Be it known that I, JOHAN PETTER HULTGREN, a subject of the King of Sweden and Norway, and a resident of Vegagatan 5, Stockholm, Sweden, have invented new and useful Improvements in Centrifugal Separators, of which the following is a specification, reference being had to the drawings accompanying and forming a part hereof.

The present invention relates to improvements in liners for centrifugal separator-drums.

The object of the invention is to provide a liner for separator-drums having a high efficiency as regards a quick and thorough separation of the milk and cream.

The invention relates particularly to such liners for separator-drums which consist of a number of rings of suitable cross-section superposed on one another and suitably held together by vertical strips or ribs, said rings leaving between them narrow slits or cracks, through which the milk passes on being separated from the cream. The invention consists, briefly, in making said rings of oval shape in order to facilitate the easier separation of the cream and milk, the cream seeking the parts nearest the center and the milk the parts farthest from the center.

In order that my invention may be easier understood, I illustrate in the accompanying drawings an embodiment of the same without limiting myself to the embodiments shown.

Figure 1:
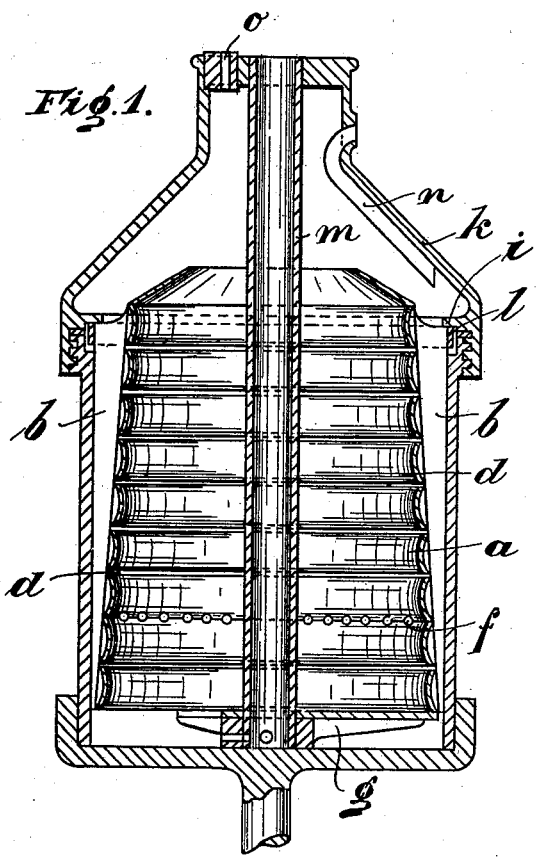
Figure 2:
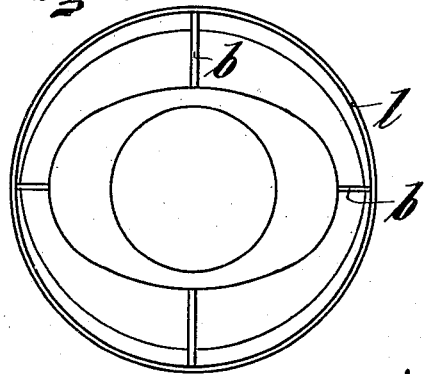

Figure 1 shows a vertical section through a centrifugal vessel provided with the said partitions. Fig. 2 shows the partitions in a plan view.

Referring to Fig. 1, the partitions are composed of a number of rings $a$, superposed on one another, said rings being seen to bend or curve inward when viewed in section. The rings are suitably held together by vertical strips or ribs $b$, to which they are secured in some convenient manner, either so as to leave narrow slits or apertures $d$ between the rings or so that the rings close tightly together, while holes $f$ are provided, preferably, at the juncture between the rings. The rings are of oval shape, as seen in Fig. 2, in order that separation may take place also on the outer side of the partitions in consequence of the centrifugal action causing the particles of cream to flow to the parts of the partitions nearer the axis of rotation, while the heavier particles of water and milk strive to move as far as possible away from the axis of rotation. The partitions suitably rest at the bottom on a foot or spider $g$ or the like, being forced against it by a flange $i$ on the cover $k$, which flange bears on a ring $l$ at the upper end of the strips $b$, so that the partitions are firmly held in their proper position. For the introduction of milk may serve in usual manner a central tube $m$, which is provided with a number of perforations at the bottom or the like.

The partitions operate in the following manner: On being introduced into the central tube $m$ the milk first rises in usual manner along the partition-walls both outside and inside. Inside of the partitions milk and cream separate owing partly to the curvature of the rings, partly to their oval form, the heavier milk striving to move as far as possible away from the axis of rotation, and consequently seeking its way into the hollows formed by the rings, whereas the lighter cream moves inward. The skim-milk passes through the cracks or slits $d$ or perforations $f$ out of the partitions and is discharged in usual manner from the separator through the discharge-pipe $n$, while the cream rising through the upper orifice of the partitions passes off through the aperture $o$. The milk rising along the outside of the partitions is separated in the manner that the cream flows to the parts of the partitions nearer the axis of rotation and rising along the latter joins the cream arriving from the inside.

Having now described my invention, what I claim as new, and desire to secure by Letters Patent, is—

The combination with a centrifugal separator-drum, of a liner consisting of a vertical series of rings, each elliptical in cross-section, substantially as and for the purpose set forth.

In testimony whereof I have signed my name to this specification in the presence of two subscribing witnesses.

JOHAN PETTER HULTGREN.

Witnesses:
GUSTAF ISFÄLT,
GIRDA LINDKVIST.